United States Patent [19]

Drolen et al.

[11] Patent Number: 5,787,969
[45] Date of Patent: Aug. 4, 1998

[54] FLEXIBLE HEAT TRANSPORT DESIGN FOR DEVELOPMENT APPLICATIONS

[75] Inventors: Bruce L. Drolen, Pasadena; David B. Esposto, Redondo Beach; George L. Fleischman, Cerritos; Calvin H. Ito, West Hills, all of Calif.

[73] Assignee: Hughes Electronics Corporation, El Segundo, Calif.

[21] Appl. No.: 577,435

[22] Filed: Dec. 22, 1995

[51] Int. Cl.[6] .............................. F28D 15/02; B64G 1/50; F28F 5/00
[52] U.S. Cl. .................. 165/41; 165/77; 165/86; 165/104.26; 244/163; 244/173
[58] Field of Search ............................. 165/41, 86, 77, 165/104.26, 104.27; 244/163, 158 R, 173; 137/340

[56] References Cited

U.S. PATENT DOCUMENTS

| | | | |
|---|---|---|---|
| 2,742,268 | 4/1956 | Tarr | 165/86 |
| 3,563,307 | 2/1971 | Paine | 165/86 |
| 3,903,699 | 9/1975 | Davis | 244/173 |
| 5,027,892 | 7/1991 | Bannon et al. | 165/41 |
| 5,117,901 | 6/1992 | Cullimore | 165/41 |

FOREIGN PATENT DOCUMENTS

| | | | |
|---|---|---|---|
| 2487961 | 2/1982 | France | 165/77 |
| 3240327 | 5/1984 | Germany | 244/173 |

Primary Examiner—John K. Ford
Attorney, Agent, or Firm—Terje Gudmestad; Michael W. Sales

[57] ABSTRACT

A closed-loop heat pipe transport design for a deployment application having a flexible section which connects to a payload structure and a deployable structure. The flexible section is a coil which is offset from the axis of rotation of the deployable structure. Upon rotation of the deployable structure around a predetermined axis, the flexible coil decompresses and sweeps in an arcuate fashion with a portion of said flexible coil aligning with the axis. When the deployable structure has completed its rotation and is fully deployed, the flexible coil will rest in substantially the same plane as it did before sweeping.

9 Claims, 2 Drawing Sheets

FLEXIBLE HEAT TRANSPORT DESIGN FOR DEVELOPMENT APPLICATIONS

BACKGROUND OF THE INVENTION

I. Field of the Invention

The present invention relates to radiator systems on spacecraft. More specifically, the present invention relates to a flexible heat transport design for deployment applications.

II. Description of the Related Art

Where a closed-loop heat pipe system is used to reject excess thermal heat from a communication satellite or any spacecraft, it is necessary for the system to have a certain amount of flexibility in allowing for deployment of radiators. In a typical closed-loop heat pipe system utilizing a two-phase capillary effect, vapor and liquid lines are used to continuously move unwanted thermal energy from a heat source to a radiator. Deployable radiators, as they are known in the art, are used to increase the heat rejection capability of a closed-loop heat pipe system. Deployable radiators reside on the exterior of the spacecraft and are coupled to the spacecraft payload structure by a hinge or multiple hinges.

The deployable radiators are stowed and folded over the exterior of the spacecraft during launch and deployed once the spacecraft reaches orbit.

Because of the rigid, fixed, axial rotation of a radiator during deployment, any attached flexible tubes are subject to overstressing and possible collapse. Collapse of tubes in a closed-loop heat pipe system will negatively affect the system's heat rejection capability. Also, because closed-loop heat pipe systems require adiabatic sections of significant length and durability, compact designs for these systems are highly desirable. It is well-known in the art to provide deployable radiators with a flexible tubing section that provides strain relief and a bias for assisting in deploying the radiator. Known methods of providing a flexible section of tubing are discussed in U.S. Pat. Nos. 3,563,307 and 5,117,901. Both of these patents utilize a helically coiled segment of tubing wound about the hinge axis upon which the radiator rotates.

The apparatus and method of the present invention achieves a closed-loop heat pipe system that overcomes the problem of tube collapse or overstress during deployment applications. More particularly, the present invention implements a flex coil that is not significantly distorted when the radiator is deployed. Also, because space is at a premium on spacecraft payload structures, the present invention's compact, lightweight design is also desirable.

SUMMARY OF THE INVENTION

The method and apparatus of the present invention utilizes an offset flexible coiled section in a closed-loop heat pipe system to permit a deployable radiator structure to be easily deployed, from a first predetermined position to a second predetermined position with respect to a spacecraft.

The coiled section is offset from the hinge axis connecting the deployable radiator to the spacecraft.

Deployable radiators are located on the exterior of the spacecraft and are coupled to a fixed radiator or other spacecraft structure by hinges. A flex coil section of the heat pipe, consisting of a flexible metal corrugated bellows covered with a thin metal sheath, is offset from the hinge upon which the deployable radiator will rotate. While the deployable radiator is stowed, the individual coils of the flex coil are concentrically wound, sharing a common axis. After the deployable radiator is deployed, the coils are no longer concentric. The flex coil does not have a fixed axis of rotation, as does the hinge, because the flex coil is secured to the fixed radiator on one end and to the deployable radiator on the other end. The flex coil therefore moves in a sweeping, arcuate fashion as the radiator is deployed. The shape and motion of the flex coil reduces the possibility of collapse of the flex coil and allows more lateral flexibility than previous designs. Increased lateral flexibility is important from a design standpoint because it is sometimes difficult to get hardware and other equipment in position to rotate on a fixed axis. Because the flex coil can be positioned in many places relative to the hinge axis, there are better and easier design possibilities. Also, due to the shorter adiabatic length requirement of a coil versus a non-coil configuration where flexibility is required, a more compact, lighter closed-loop heat pipe design can be achieved.

In an exemplary embodiment, a deployable radiator is folded or in the "stowed" configuration when the spacecraft is launched. The deployable radiator is folded on top of the fixed radiator. The deployable radiator is secured to the spacecraft with launch locks, and is deployed by opening the locks after launch. Once the locks are opened, the flex coil facilitates deployment of the radiator by decompressing from its stowed position. Because the flex coil is attached to the fixed radiator on one end and to the deployable radiator on the other end, and makes a sweeping, arcuate motion, the flex coil does not collapse during radiator deployment. The present invention, therefore, achieves greater reliability as there is less likelihood for flex coil collapse during deployment.

DETAILED DESCRIPTION OF THE DRAWINGS

DETAILED DESCRIPTION

Figure 1:
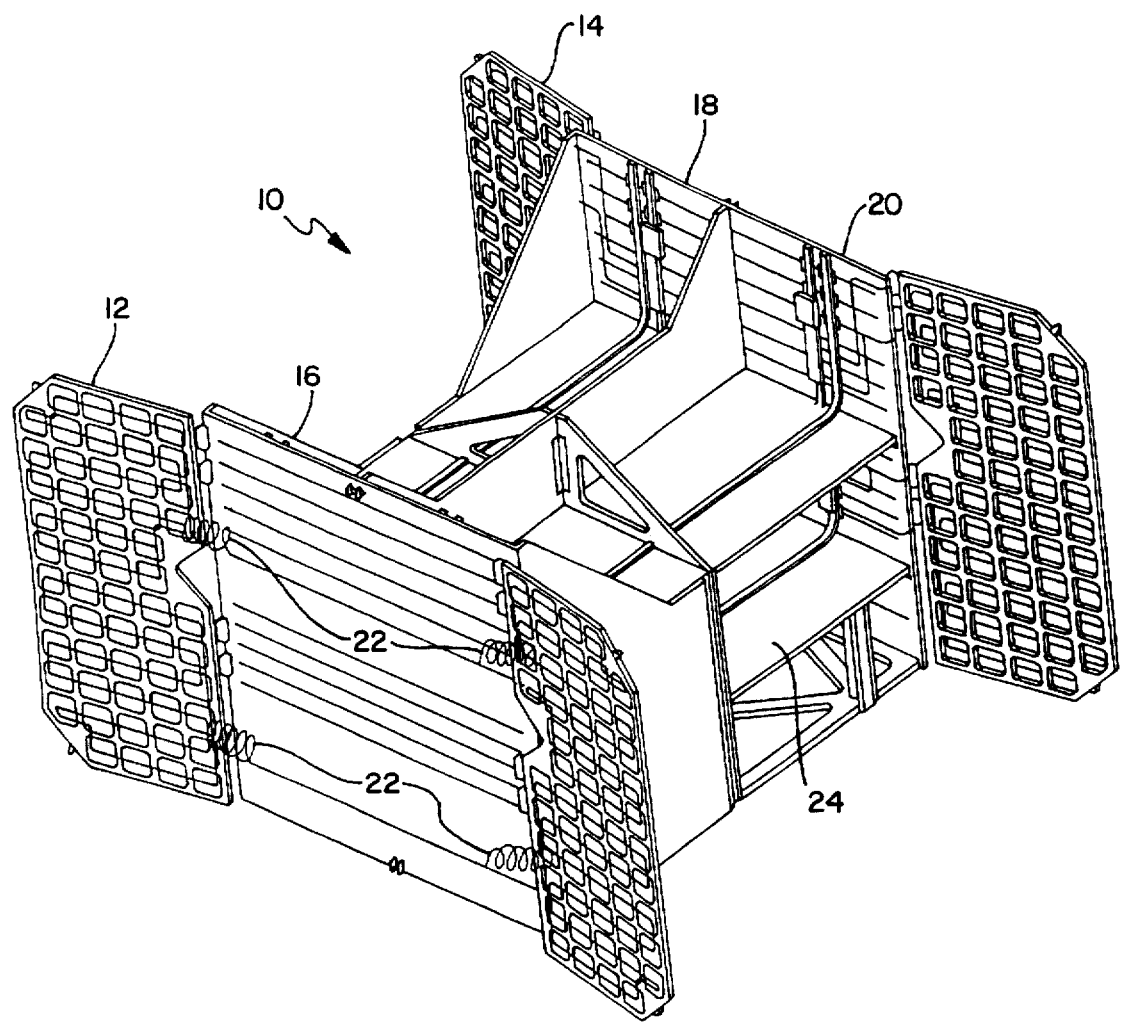
FIG. 1 is an illustration of a payload structure showing several possible positions of a flex coil in a deployable radiator design.

An exemplary deployable radiator system in which the present invention is embodied is illustrated in FIG. 1. While the present invention could be used on any number of spacecraft, the radiator system here is utilized on a satellite communication payload structure.

An illustration of the path of fluid in a closed-loop heat pipe system embodying the present invention is herein described. There is an evaporator from which heat from a heat source is absorbed. A fluid is drawn into capillary passages of the evaporator, vaporized, and then transported via a vapor line to the condensation chamber where the vapor is converted to liquid. The vapor enters the vapor line which includes a first flex coil and moves to the radiator where heat is rejected from the spacecraft. As the vapor cools in the condensation section it condenses to a liquid form. The liquid is transported back through a second flex coil and returns via a liquid line to the evaporator. The flex coils in the vapor and liquid line sections permit the deployable radiator structure to be deployed from a first predetermined position to a second predetermined position with respect to the spacecraft.

In the preferred embodiment disclosed herein, there are fixed radiators and deployable radiators on a payload structure. Typically, fixed radiators are employed on several sides of the spacecraft payload structure. Deployable radiators provide increased surface area exposure to the cool outer space, which is a key factor in determining the heat rejection capability of a radiator system. Both the fixed and deployable radiators work on thermophysical principles that are well-known in the art. Generally, the radiators function as heat sinks to which thermal energy, generated by equipment aboard the spacecraft, is conducted to and thereafter rejected from. Spacecraft temperature is thereby reduced. Various methods may be used to move the thermal energy from the communication equipment to the radiators. The method of the present invention, well-known in the art, uses a two-phase capillary system wherein thermal energy is moved to the radiators and thereby rejected from the spacecraft.

In the present invention, the deployable radiators begin in the folded or "stowed" position as the spacecraft is launched. The deployable radiators rest externally to the spacecraft payload structure. The deployable radiators may rest on top of a panel, or a panel housing a fixed radiator. The deployable radiator itself may be some other deployable structure or a simple panel. Typically, though, there are deployable radiators located on both sides of the spacecraft, on opposite sides, each coupled to a fixed radiator by at least one hinge. The hinge is connected to the outboard side of the payload structure. If a fixed panel or a fixed radiator is in place, the hinge will connect to one or the other of these. A flex coil is offset from the position of the hinge and is fastened to the payload structure on one end and to the deployable radiator on the other end. The flex coil is somewhat compressed while in the stowed position. While the deployable radiator is stowed, the individual coils of the flex coil are concentrically wound, sharing a common axis. After the deployable radiator is deployed, the coils are no longer concentric. Upon deployment of the radiator, the flex coil will move in a sweeping, arcuate fashion, pivoted on the end of the coil fastened to the fixed radiator. Also, the flex coil completes its arcuate sweep in substantially the same plane on which the flex coil rested while in the stowed position. This type of movement, while stretching the coils, does not allow the coils to collapse about themselves. For the purposes of this description, the description of the operation and makeup of one deployable radiator, flex coil and hinge shall apply to other deployable radiators, flex coils and hinges on the spacecraft unless specifically noted otherwise.

Referring to FIG. 1, a payload structure 10 for a communication satellite is shown. The payload structure 10 has a fixed radiator panel 16 on one side and a fixed radiator panel 18 on the opposite side. The radiators in the preferred embodiment employ heat pipes 20 to carry thermal energy from the equipment modules (not shown) to the radiators. The heat pipes 20 are tubes that transport vapor along their length to the radiators and return condensed liquid by capillary forces. The thermo-energy from the vapor is rejected from the spacecraft once it reaches the cooler radiators. As the vapor cools, it condenses to a liquid and circulates back to the modules, so that the process can repeat itself.

In the stowed position (not shown in FIG. 1), the deployable radiator has launch locks (not shown) which secure the radiator during launch and transfer orbit. The launch locks are opened sometime after launch. Once the launch locks are opened, the flex coils of the closed-loop heat pipe system will decompress and assist in the deployment of the deployable radiator.

Several possible positions of the flex coil 22 are shown in FIG. 1. In each case, the flex coil is fastened on one end to a fixed radiator panel 16 and on the other end to a deployable radiator 12. In the preferred embodiment, the flex coil has a flexible metal outer sheath and a corrugated bellows tube (not shown) within the sheath, such bellows tubes being well-known in the art. The bellows tube will also be made of a flexible metal material. The fixed radiator panel 16 and the fixed radiator panel 18 are exposed upon deployment of the deployable radiator 12 and deployable radiator 14, respectively. Upon deployment, each radiator works to reject unwanted heat from the spacecraft. The interior space 24 where the heat generating modules will rest is also shown.

Figure 2:
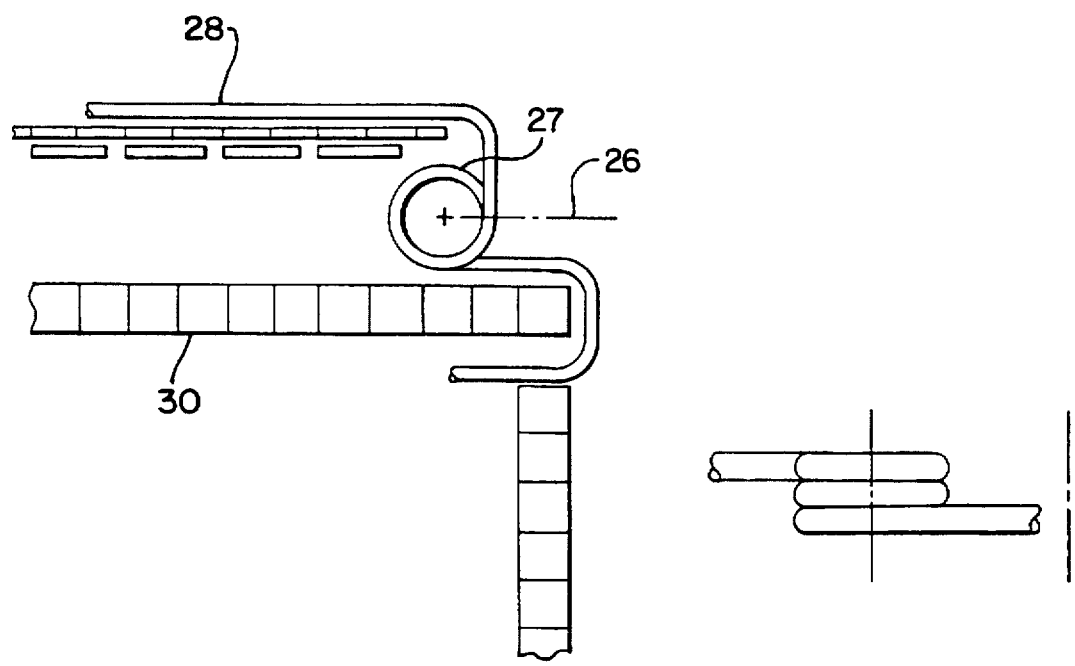
FIG. 2 is an illustration of a flex coil in the stowed position, along with a side view of the flex coil, in accord with a preferred embodiment of the invention.

FIG. 2 is an illustration of the positioning of a flex coil 27 relative to a hinge axis 26, where a deployable radiator 28 is in a stowed position. FIG. 2 illustrates that the flex coil 27 is offset from the hinge axis 26. The flex coil 27 is shown connected to a fixed radiator 30 and a deployable radiator 28, such that the flex coil 27 is substantially between the fixed radiator 30 and the deployable radiator 28 in the stowed position. A side view of the flex coil 27 and its position with respect to the hinge axis 26 is also shown in FIG. 2.

Figure 3:
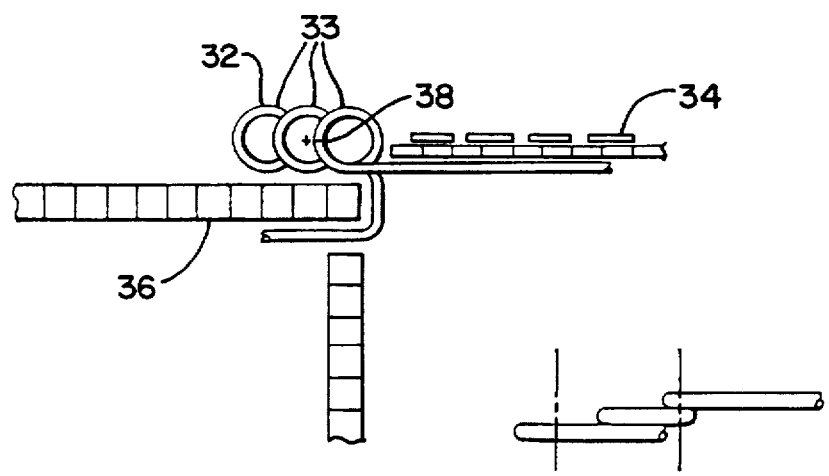
FIG. 3 is an illustration of a flex coil in the deployed position, along with a side view of the flex coil, in accord with a preferred embodiment of the invention.

FIG. 3 is an illustration of the positioning of a flex coil 32 relative to a hinge axis 38, where the deployable radiator 34 is in the deployed position. The flex coil 32 is pivoted on the fixed radiator 36, and sweeps in a arcuate fashion during deployment. After the deployable radiator is deployed, the coils 33 are no longer concentric. Furthermore, only a portion of the flex coil 32 is aligned with the hinge axis 38 after deployment. Also, the flex coil 32 completes its arcuate sweep in substantially the same plane on which the flex coil 32 rested while in the stowed position. The flex coil 32, accordingly, does not twist or bend. This prevents the flex coil 32 from overstressing or collapsing on itself, and ultimately interfering with the heat rejection process. In the preferred embodiment, flex coils are positioned such that they will not make contact with a hinge whether a radiator is in the stowed or deployed positions.

In an exemplary operation of a flex coil in a deployable radiator design, the payload structure during launch will have a deployable radiator folded or stowed over a fixed radiator panel. The fixed radiator panel will have heat pipes that are in thermal communication with the heat sources within the spacecraft. After launch, a deployable radiator is deployed by opening the launch locks. A flex coil attached to the fixed radiator panel and the deployable radiator will decompress, aiding in the deployment of the radiator as it decompresses. Prior to deployment, the individual coils of the flex coil are concentric. The flex coil stretches and sweeps in an arcuate fashion as the deployable radiator unfolds, stopping at a point where only a portion of the coil aligns with the hinge axis. The flex coil completes its arcuate sweep in the same plane on which the flex coil rested when in the stowed position. After the deployable radiator is deployed, the coils are no longer concentric. The heat pipes will then transfer heat energy from heat source modules to the fixed radiator panel and to the external deployable radiator, whereby the heat may be rejected from the spacecraft.

It is therefore intended that the foregoing detailed description be regarded as illustrative rather than limiting, and that it be understood that it is the following claims, including all equivalents, which are intended to define the scope of the invention.

What is claimed is:

1. A payload structure for a deployment application, comprising:

a deployable structure external to said payload structure;

a hinge permitting said deployable structure to rotate about a predetermined axis with respect to said payload structure; and at least one flex coil having concentric coils, connected on one end to said payload structure and on the other end to said deployable structure, said at least one flex coil being both offset from said hinge axis and between said payload structure and said deployable structure, and said concentric coils being non-concentric after said deployable structure is deployed.

2. The payload structure for a deployment application of claim 1, wherein a portion of said at least one flex coil aligns with said axis after said deployable structure rotates.

3. The payload structure for a deployment application of claim 1, wherein said at least one flex coil completes an arcuate sweep in a plane substantially the same as a plane on which said at least one flex coil rested before said deployable structure rotated.

4. The payload structure for a deployment application of claim 1, wherein said at least one flex coil is made of a flexible material.

5. The payload structure for a deployment application of claim 1, wherein said at least one flex coil is made of a flexible metal.

6. The payload structure for a deployment application of claim 1, wherein said deployable structure is a radiator.

7. A method of deploying a deployable structure from a payload structure, comprising the steps of:

connecting said deployable structure by a hinge having a fixed axis to said payload structure;

attaching at least one flex coil having concentric coils to said deployable structure and to said payload structure, said flex coil being offset from said fixed axis;

securing said deployable structure to said payload structure with a lock;

unsecuring said lock after launching said deployable structure;

rotating said deployable structure around said fixed axis; and sweeping said flex coil in an arcuate fashion, such that said flex coil sweeps in a plane which is substantially the same as a plane said flex coil rested on before said rotation of said deployable structure, and said concentric coils being non-concentric after said deployable structure is deployed.

8. The method of deploying a deployable structure from a payload structure of claim 7 wherein a portion of said at least one flex coil aligns with said fixed axis after said deployable structure rotates.

9. The method of deploying a deployable structure from a payload structure of claim 8 wherein said deployable structure is a radiator.

* * * * *